Figure 1:
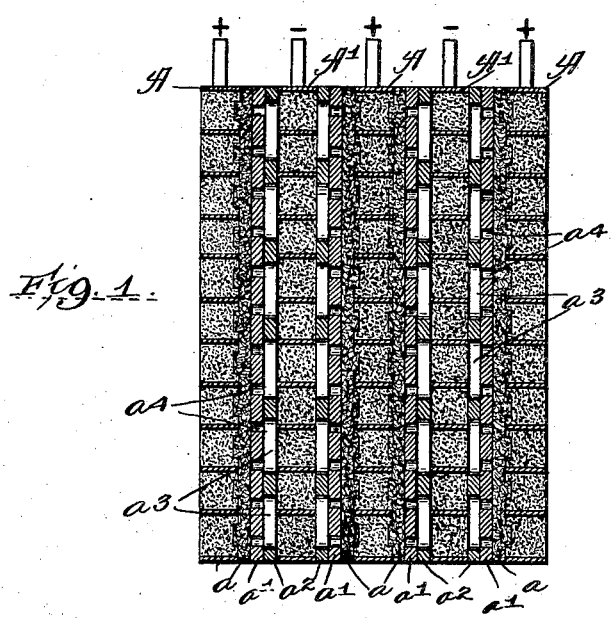

No. 696,489. Patented Apr. 1, 1902.
J. K. PUMPELLY.
SEPARATOR FOR BATTERY PLATES.
(Application filed Apr. 8, 1901.)
(No Model.)

Witnesses
Ray White
Harry B. White

Inventor:
James K. Pumpelly
By Forte Bain
Attorney

United States Patent Office.

JAMES K. PUMPELLY, OF CHICAGO, ILLINOIS, ASSIGNOR TO WESTERN STORAGE BATTERY COMPANY, OF INDIANAPOLIS, INDIANA, A CORPORATION OF INDIANA.

SEPARATOR FOR BATTERY-PLATES.

SPECIFICATION forming part of Letters Patent No. 696,489, dated April 1, 1902.

Application filed April 8, 1901. Serial No. 54,832. (No model.)

*To all whom it may concern:*

Be it known that I, JAMES K. PUMPELLY, a citizen of the United States, residing at Chicago, county of Cook, and State of Illinois, have invented certain new and useful Improvements in Battery-Separators; and I do hereby declare the following to be a full, clear, and exact description of the invention, such as will enable persons skilled in the art to which it appertains to make and use the same.

My invention relates to separators for batteries, more especially to that class of batteries known as "electric accumulators or storage batteries."

The object of my invention is to provide a separator to be applied between the elements comprising a battery against the surface of the respective plates, so that the said plates may be separated and maintained a predetermined distance apart from each other and the separating material as a whole will at the time act as an intimate support for the active matter confined within the grids or on the surface of the said electrodes.

It has heretofore been considered a very difficult problem to secure a material which possesses the required porosity and which is of such a nature as to remain unaffected by the action of the gases and the electrolyte when placed adjacent to the positive-pole electrode of a storage battery. I have found that spun glass or "glass-wool" answers this purpose admirably; but it is known that glass in such a form is very expensive. I prefer, therefore, to apply the fibrous glass to the active surface of the positive-pole electrode, to which it adheres with considerable tenacity, and retain it in place by a supporting-plate or by other porous or fibrous material of a cheap quality. In applying the spun glass to one of said plates or electrodes I find that it is quite easy to apply uniformly as thin a coating as a sixteenth of an inch in thickness, and against this coating of spun glass I preferably place my separator, of a peculiar design, which is herewith illustrated.

I am quite aware that fiber, spongy, and other pervious material have before been used for separating the electrodes in a storage battery—such as wool fiber, &c.—but I have noticed that when such material is placed in contact with the positive pole or oxidized electrode, that the chemical, electrical, or other action produces glucose and other undesirable products, and formic acid is sometimes set free. The effect of these results is to cut the plate and to otherwise destroy it and to close the many interstices in the formerly pervious separating material and shut off the circulation of the electrolyte and prevent the escape of the evolved gases. The glass-wool which I use is very pervious to the electrolyte and the gases that are evolved in solution, and remains unaffected by any chemical or electrical action that may take place in the battery.

Figure 2:
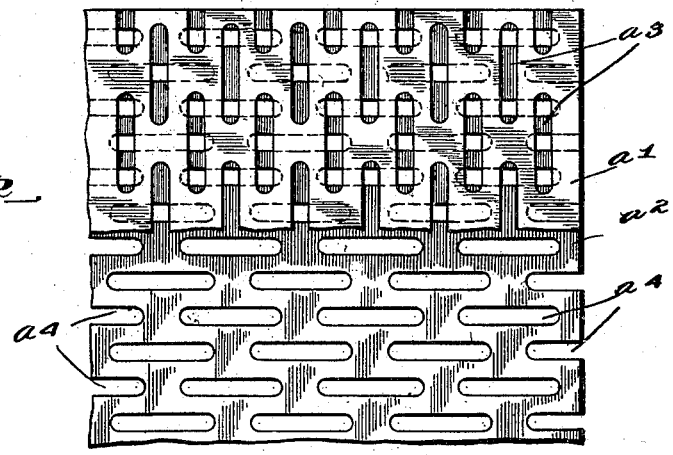

In the drawings, Figure 1 represents a section through a battery-cell in which my separator is employed. Fig. 2 is a broken-away portion of a compound separator-plate which I have used with good results.

In both figures the same letters of reference indicate similar parts.

A represents a positive-pole electrode of an ordinary storage-battery cell.

A' represents the negative-pole electrodes of the same cell.

$a$ is a layer of spun fiber glass applied upon the faces of the positive-pole electrodes while the active material is soft.

$a'$ and $a^2$ comprise my separator and support, formed of two sheets of, preferably, insulating material, each having a series of parallel slots, the slots in the respective sheets being placed at right angles with reference to each other, so that the gas entering any one of the longitudinal slots may escape through the vertical slot to the next longitudinal slot and so on until liberated from the electrolyte at the top of the cell.

$a'$ and $a^2$ represent, jointly, the backing of my separator and form a support for it.

$a^3$ and $a^4$ show the series of vertical and horizontal slots in the respective sheets.

I prefer not to fill up the space intervening between the positive and negative electrodes entirely with spun glass, because I have found that such glass is very expensive, and that other pervious material may be used, and will answer as well when placed in contact with the negative-pole electrodes only and not in direct contact with the positive-pole. As before stated, the action on the pervious material in contact with the opposing electrode is not so deleterious, as such action is on that part of the material which is in contact with the positive-pole electrode. The separator, which I have shown and described, comprises a layer of spun or spongy glass in intimate contact with the positive-pole electrode, and a suitably-formed open or pervious supporting-plate between the said layer of glass and the next adjoining or opposing electrode is very efficient and not expensive, is durable, and I have found from experience that it answers the purpose for which it is intended most admirably. Instead of using the compound plate $a'$ and $a^2$, as shown, I may fill the space with any suitable fibrous or spongy material, such as wood fiber, asbestos, or similar substance, which have heretofore been used for this purpose, without the fibrous glass, and which are well adapted for the purpose when not brought into intimate contact with the positive-pole electrode. It is also evident that I may fill the entire space with glass or other vitreous material, of a spongy nature, so that it will then be in contact with the positive-pole and negative electrodes; but, as before stated, this material is expensive, and other fibrous material will answer the purpose when they are not placed in intimate contact with the surface of the positive-pole plate or electrode.

My invention consists, essentially, in covering the active surfaces of the positive-pole electrode with a spongy, fibrous, or other pervious inert material, such as wool-glass or other vitreous material of a like nature, or coating the surface of the positive-pole electrode with a thin coating of such material and filling the space intervening between the surface of the said glass and the negative-pole electrode with other pervious material or perforated sheet or sheets to permit the free circulation of the electrolyte and the escape of the gases.

Having described my invention, what I claim as new, and desire to secure by Letters Patent of the United States, is—

A separator for electric accumulators comprising a layer of inert, vitreous material, adapted to be applied to the face of one of the plates of a battery, and a support for said layer consisting of two sheets of insulating material each having a series of parallel elongate slots placed at right angles and overlapping each other.

In testimony whereof I have signed this specification, in the presence of two subscribing witnesses, this 28th day of February, A. D. 1901.

JAMES K. PUMPELLY.

Witnesses:
 FORÉE BAIN,
 M. F. ALLEN.